United States Patent
Kagohashi (10) Patent No.: US 11,367,906 B2
(45) Date of Patent: Jun. 21, 2022

(54) LEAD-ACID BATTERY

(71) Applicant: GS Yuasa International Ltd., Kyoto (JP)

(72) Inventor: Hiroki Kagohashi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 17/049,830

(22) PCT Filed: Apr. 1, 2019

(86) PCT No.: PCT/JP2019/014500
§ 371 (c)(1),
(2) Date: Oct. 22, 2020

(87) PCT Pub. No.: WO2019/225161
PCT Pub. Date: Nov. 28, 2019

(65) Prior Publication Data
US 2021/0249699 A1   Aug. 12, 2021

(30) Foreign Application Priority Data
May 23, 2018  (JP) .............................. JP2018-098890

(51) Int. Cl.
*H01M 4/00* (2006.01)
*H01M 10/06* (2006.01)
(Continued)

(52) U.S. Cl.
CPC ............. *H01M 10/06* (2013.01); *H01M 4/20* (2013.01); *H01M 4/627* (2013.01)

(58) Field of Classification Search
CPC .... H01M 4/20; H01M 2004/027; H01M 4/62; H01M 4/627; Y02E 60/10
See application file for complete search history.

(56) References Cited

U.S. PATENT DOCUMENTS

| 2009/0325068 | A1 | 12/2009 | Boden et al. |
| 2017/0092934 | A1 | 3/2017 | Hamano et al. |
| 2020/0144619 | A1* | 5/2020 | Hamilton ............... H01M 4/625 |

FOREIGN PATENT DOCUMENTS

| JP | 63-126161 A2 | 5/1988 |
| JP | 2001-35485 A | 2/2001 |

(Continued)

OTHER PUBLICATIONS

International Search Report (ISR) dated Jul. 2, 2019 filed in PCT/JP2019/014500.

*Primary Examiner* — Cynthia H Kelly
*Assistant Examiner* — Monique M Wills
(74) *Attorney, Agent, or Firm* — Rankin, Hill & Clark LLP (57) ABSTRACT

A lead-acid battery provided with a negative electrode plate, a positive electrode plate, and an electrolyte solution. The negative electrode plate includes a negative current collector and a negative electrode material. When it is defined in a log differential pore volume distribution of the negative electrode material that
 a) a region having a pore size of 1 to 3 μm is a P region,
 b) a region having a pore size of 6 to 15 μm is a Q region,
 c) a maximum value of the log differential pore volume in the P region is P, and
 d) a maximum value of the log differential pore volume in the Q region is Q,
after initial degradation, during use, or after 1220 cycles in a light-load life test in which charge and discharge of constant current discharge at 25 A for one minute and constant voltage charge at 2.47 V/cell and an upper limit current of 25 A for ten minutes are repeated at a test temperature of 75° C., the log differential pore volume distribution of the negative electrode material has a peak p corresponding to the maximum value P in (Continued)

the P region and a peak q corresponding to the maximum value Q in the Q region, and the maximum value P and the maximum value Q satisfy $0.25 \leq P/(P+Q) \leq 0.63$.

15 Claims, 7 Drawing Sheets

(51) Int. Cl.
*H01M 4/20* (2006.01)
*H01M 4/62* (2006.01)

(56) References Cited

FOREIGN PATENT DOCUMENTS

| | | |
|---|---|---|
| JP | 3468492 B2 | 11/2003 |
| JP | 3511949 B2 | 3/2004 |
| JP | 5190562 B1 | 4/2013 |
| JP | 2014-123525 A | 7/2014 |
| JP | 5780106 B2 | 9/2015 |
| WO | 2013/046499 A1 | 4/2013 |
| WO | 2015/181865 A1 | 12/2015 |

* cited by examiner

LEAD-ACID BATTERY

TECHNICAL FIELD

The present invention relates to a lead-acid battery.

BACKGROUND ART

Lead-acid batteries are used in various applications, including automotive, industrial, and other applications. A lead-acid battery is provided with an element in which a positive electrode plate and a negative electrode plate are alternately laminated with a separator therebetween. The positive electrode plate includes a positive current collector and a positive electrode material, and a negative electrode plate includes a negative current collector and a negative electrode material.

In order to reduce the weight of a sealed lead-acid battery by reducing the amount of active material used for a negative electrode without lowering the charge-discharge characteristics of the battery, Patent Document 1 proposes setting the volume of a pore size of 10 μm or more to 0.02 to 0.15 ml/g and the volume of a pore size of 1 to 6 μm to 0.01 to 0.03 ml/g in a negative active material after the chemical conversion of a container.

Patent Document 2 shows a pore size distribution in which the pore volume of the negative active material has two peaks at around a pore size of 1.2 μm and 1.7 μm, respectively.

PRIOR ART DOCUMENTS

Patent Documents

Patent Document 1: JP-A-2001-35485
Patent Document 2: WO/2013/046499

SUMMARY OF THE INVENTION

Problems to Be Solved By the Invention

From the viewpoint of extending the life of a lead-acid battery, it is required to maintain low-temperature high-rate (HR) discharge characteristics at a practical level even after a considerable charge-discharge cycle is repeated at a high temperature. It is also required to reduce the amount of liquid reduction per cycle.

However, when a light-load life test is conducted at a high temperature, the low-temperature HR discharge characteristics of the lead-acid battery may decrease, or the amount of liquid reduction may remarkably increase.

Means for Solving the Problems

One aspect of the present invention relates to a lead-acid battery provided with a negative electrode plate, a positive electrode plate, and an electrolyte solution. The negative electrode plate includes a negative current collector and a negative electrode material. When it is defined in a log differential pore volume distribution of the negative electrode material that
  a) a region having a pore size of 1 to 3 μm is a P region,
  b) a region having a pore size of 6 to 15 μm is a Q region,
  c) a maximum value of the log differential pore volume in the P region is P, and
  d) a maximum value of the log differential pore volume in the Q region is Q, in a light-load life test in which charge and discharge of constant current discharge at 25 A for one minute and constant voltage charge at 2.47 V/cell and an upper limit current of 25 A for ten minutes are repeated at a test temperature of 75° C. over 1220 cycles, the log differential pore volume distribution of the negative electrode material after 1220 cycles has a peak p corresponding to the maximum value P in the P region and a peak q corresponding to the maximum value Q in the Q region, and the maximum value P and the maximum value Q satisfy $0.25 \leq P/(P+Q) \leq 0.63$.

Advantages of the Invention

According to the present invention, even after a light-load life test at a high temperature, the low-temperature HR discharge characteristics of the lead-acid battery are maintained well, and an increase in the amount of liquid reduction is also prevented.

MODE FOR CARRYING OUT THE INVENTION

A lead-acid battery according to an embodiment of the present invention is provided with a negative electrode plate, a positive electrode plate, and an electrolyte solution, and the negative electrode plate includes a negative current collector and a negative electrode material. Here, when it is defined in a log differential pore volume distribution of the negative electrode material that a) a region having a pore size of 1 to 3 μm is a P region,
b) a region having a pore size of 6 to 15 μm is a Q region,
c) a maximum value of the log differential pore volume in the P region is P, and
d) a maximum value of the log differential pore volume in the Q region is Q, the "log differential pore volume distribution of the negative electrode material after 1220 cycles in a 75° C. 1'-10' light-load life test" described below has the following features:

(Condition A)

The log differential pore volume distribution has a peak p corresponding to the maximum value P in the P region and a peak q corresponding to the maximum value Q in the Q region.

(Condition B)

The maximum value P (corresponding to the peak p) of the log differential pore volume in the P region and the maximum value Q (corresponding to the peak q) of the log differential pore volume in the Q region satisfy the formula: 0.25≤R1220≤0.63, where P/(P+Q)=R1220.

The number of peaks present in each of the P region and the Q region is not limited to one but may be two or more. That is, the P region may only have at least a peak corresponding to the maximum value P, and the Q region may only have at least a peak corresponding to the maximum value Q.

A lead-acid battery in which the log differential pore volume distribution of the negative electrode material after 1220 cycles in the 75° C. 1'-10' light-load life test satisfies conditions A and B continuously exhibits favorable performance thereafter. Specifically, the low-temperature HR discharge characteristics are maintained well, and an increase in the amount of liquid reduction is also prevented. Such a lead-acid battery has a long life and can be used for a longer period.

Here, the lead-acid battery after 1220 cycles in the 75° C. 1'-10' light-load life test corresponds to the lead-acid battery in use. The lead-acid battery in use is a lead-acid battery that has not reached its end of life and can be used continuously thereafter.

The lead-acid battery is repeatedly used for a long period, and hence it is difficult to extend the life of the lead-acid battery sufficiently only by controlling the electrode structure in an initial state. Even a lead-acid battery having favorable performance in an initial cycle may be easily degraded after a certain period of use. On the other hand, when the electrode structure of the lead-acid battery in use is controlled, the performance of the lead-acid battery can be maintained well even in a later stage of the cycle.

The lead-acid battery after 1220 cycles or in use in the 75° C. 1'-10' light-load life test can be rephrased as a lead-acid battery after initial degradation.

The lead-acid battery has a feature of being degraded to a certain level in the initial stage of use and then stabilizes. The degradation in the initial stage is caused by a change in the surface area of the active material of the electrode material due to the use, and the change can be confirmed by measuring the low-temperature HR discharge duration time of the battery.

As an example of initial degradation of a new battery, a 75° C. 1'-10' light-load life test is repeated for 100 cycles, the low-temperature HR discharge duration time is measured every 100 cycles, and it can be determined that the initial degradation has occurred when the rate of decrease in the discharge duration time becomes 3% or less (with respect to the discharge duration time before 100 cycles).

Even in a case where the history of the battery is not known, and it cannot be seen whether the battery is new or after initial degradation, the battery can be determined as the battery after initial degradation when, for example, the 75° C. 1'-10' light-load life test is repeated for 100 cycles and the rate of decrease in the low-temperature HR discharge duration time is 3% or less.

The battery after 1220 cycles in the 75° C. 1'-10' light-load life test obviously corresponds to the battery after initial degradation, so that the battery can be determined as the battery after initial degradation without the need to determine whether the battery has undergone the initial degradation. Further, it is possible to determine whether the battery falls under the invention by evaluating the battery after the test.

The pores in the P region having a pore size of 1 to 3 μm are considered to have an action of improving the low-temperature HR discharge characteristics and charge acceptance. In general, lead sulfate crystals grow during discharge. When the negative electrode material has pores having a small pore size in the P region, the crystal growth of lead sulfate proceeds rapidly. In the pores having a small pore size, the moving distance of lead ions ($Pb^{2+}$) generated by discharge until the lead ions reach the crystal of lead sulfate decreases. Therefore, the resistance during discharge decreases, and favorable low-temperature HR discharge characteristics are easily exhibited. Similarly, it is considered that during charge, the moving distance until the lead ions ($Pb^{2+}$) are reduced to Pb decreases, and the charge acceptance is improved.

In addition, in view of the fact that the low-temperature HR discharge characteristics after the 1'-10' light-load life test at a temperature as high as 75° C. are well maintained, it can be said that the pores in the P region having a pore size of 1 to 3 μm improve high-temperature resistance.

The pores in the Q region having a pore size of 6 to 15 μm are considered to have an action of reducing a decrease in the electrolyte solution. When the negative electrode material has pores having a large pore size in the Q region, the surface area of the negative electrode material tends to be small. The amount of liquid reduction by electrolysis of water is closely related to the surface area of the negative electrode material. It is considered that the decrease in the surface area reduces the liquid reduction. That is, by satisfying the conditions A and B, even after the light-load life test at a high temperature, the charge acceptance of the lead-acid battery is maintained well, and the increase in the amount of liquid reduction is also prevented.

In the lead-acid battery after 1220 cycles or in use in the 75° C. 1'-10' light-load life test, a state where 0.25≤R1120≤0.63 is satisfied means that the negative electrode material used in the late cycle each has a plurality of pores having a specific action and effect in a good balance. From the viewpoint of achieving a more excellent pore structure, 0.3≤R1220≤0.6 is preferred, and 0.4≤R1220≤0.6 may be used.

R1220 may be 0.30 or more, 0.25 or more, 0.63 or less, or 0.60 or less, and these upper and lower limits may be combined in any manner.

In the lead-acid battery after initial degradation, a state where 0.25≤P/(P+Q)≤0.63 is satisfied means that the negative electrode material used in the late cycle has a plurality of pores each having a specific action and effect in a good balance. From the viewpoint of achieving a more excellent pore structure, $0.3 \leq P/(P+Q) \leq 0.6$ is preferred, and $0.4 \leq P/(P+Q) \leq 0.6$ may be used. $P/(P+Q)$ may be 0.30 or more, 0.25 or more, 0.63 or less, or 0.60 or less, and these upper and lower limits may be combined in any manner.

The above embodiment is particularly useful in a flooded-type (vented) lead-acid battery in which a decrease in the amount of liquid reduction is desired. However, the above embodiment is also useful in a control valve regulated (sealed) lead-acid battery. For example, the amount of current for overcharge during float charge is reduced, and a corrosion reaction ($Pb \rightarrow PbO_2$) of the positive current collector can be reduced together with electrolysis of water.

Next, before the 75° C. 1'-10' light-load life test, $0.7 \leq P/(P+Q)$ is preferably satisfied, and $0.9 \leq P/(P+Q)$ is more preferably satisfied. Here, the maximum value P and the maximum value Q need not correspond to the maximum peaks in the respective regions. Before the 75° C. 1'-10' light-load life test means the period of the initial cycle in normal use. In the initial cycle, it is important that the lead-acid battery has high power, and in particular, the low-temperature HR discharge characteristics are important. Therefore, when $P/(P+Q)$ before the 75° C. 1'-10' light-load life test is R0, $0.7 \leq R0$ is preferably satisfied, and $0.9 \leq R0$ is more preferably satisfied.

Before use, $0.7 \leq P/(P+Q)$ is preferably satisfied, and $0.9 \leq P/(P+Q)$ is more preferably satisfied.

Before the initial degradation, $0.7 \leq P/(P+Q)$ is preferably satisfied, and $0.9 \leq P/(P+Q)$ is more preferably satisfied.

There are various methods for obtaining a negative electrode material satisfying conditions A and B.

First, the pore structure of the negative electrode material after chemical conversion can be designed by controlling the physical properties of the negative electrode paste which is a raw material of the negative electrode material. Specifically, the particle size of lead powder as a raw material, the amount of water mixed with the lead powder, the amount of sulfuric acid aqueous solution mixed with the lead powder, the concentration of the sulfuric acid aqueous solution, the amount of the sulfuric acid aqueous solution blended with the lead powder per hour, and the like may only be controlled.

Second, barium sulfate added to the negative electrode material affects the log differential pore volume distribution of the negative electrode material after chemical conversion. Barium sulfate can be a crystal nucleus of lead sulfate. Crystals with barium sulfate as a core can form pore structures different from those of lead sulfate without barium sulfate as a core The addition amount of barium sulfate also affects the pore structure of the electrode material after chemical conversion.

Third, an organic expander added to the negative electrode material greatly affects the log differential pore volume distribution of the negative electrode material after chemical conversion. Particularly, R1220 can be controlled relatively easily by containing a first organic expander and a second organic expander different from the first organic expander in the negative electrode material. The organic expander tends to form a pore structure having a specific pore size depending on its type. The change in pore structure due to the degradation of the negative electrode material also varies depending on the type of the organic expander. Therefore, when a plurality of different organic expanders are used in combination, a plurality of peaks are likely to appear in the log differential pore volume distribution of the negative electrode material after 1220 cycles in the 75° C. 1'-10' light-load life test.

Next, a method for evaluating a lead-acid battery will be described.
<75° C. 1'-10' Light-Load Life Test>

A 2 V sample cell X is produced. In a case where a completed lead-acid battery having a plurality of cell chambers is evaluated, a sample cell X may only be produced by cutting out a 2V cell from the lead-acid battery.

The sample cell X is subjected to charge-discharge of constant current discharge at 25 A for one minute and constant voltage charge at 2.47 V and an upper limit current of 25 A for ten minutes, and the cycle is repeated at a test temperature of 75° C.
<Low-Temperature HR Discharge Characteristics After 1220 Cycles>

In the 75° C. 1'-10' light-load life test, charge and discharge of the sample cell X is repeated over 1220 cycles, and then the low-temperature HR discharge duration time is measured. Specifically, the sample cell X in a fully charged state is subjected to a constant current discharge at a test temperature of −15° C. with a current five times a value indicated in a five-hour rate rated capacity to a termination voltage of 1.0 V, and the discharge duration time is measured.
<Amount of Liquid Reduction Per Cycle>

An approximate straight line indicating the relationship between the number of charge-discharge cycles of the sample cell X and the amount of liquid reduction in the 75° C. 1'-10' light-load life test is determined. The amount of liquid reduction per cycle is determined from a slope of an approximate straight line.
<Amount of Electricity at Tenth Second>

A sample cell Y is produced from two positive electrode plates and one negative electrode plate stored in a bag-shaped separator. As the two positive electrode plates, any positive electrode plate having a sufficiently large capacity with respect to the negative electrode plate may only be used. 0.6 times the theoretical capacity of the negative electrode is set as the rated capacity, and the sample cell Y in the fully charged state is discharged for 30 minutes at a current 0.2 times the rated capacity. The sample cell Y after discharge is left for 12 hours. Thereafter, a potential of −0.3 V is applied to the negative electrode plate with respect to a reference electrode, and the amount of electricity is measured up to a tenth second. [Pb|$PbSO_4$|$H_2SO_4$(s.g.1.30)] is used as the reference electrode.

Hereinafter, the lead-acid battery according to the embodiment of the present invention will be described for each of the main constituent elements, but the present invention is not limited to the following embodiment.

(Negative Electrode Plate)

A negative electrode plate for a lead-acid battery includes a negative current collector and a negative electrode material and may include a sticking member when necessary. The negative electrode material is obtained by removing the negative current collector and the sticking member from the negative electrode plate. The sticking member is a member, such as a mat or a pasting paper, arbitrarily stuck to the negative electrode plate. The negative electrode plate includes a sticking member that is stuck to the negative electrode plate and is used as an integral part of the negative electrode plate. On the other hand, when the sticking member is attached to the separator, the sticking member is included in the separator.

As the lead or lead alloy used for the negative current collector, a Pb—Ca based alloy, a Pb—Ca—Sn based alloy, lead having a purity of three nines or higher, and the like are used preferably. The lead or lead alloy may further contain Ba, Ag, Al, Bi, As, Se, Cu, or the like as an additive element. The negative current collector may have a plurality of lead alloy layers having different compositions.

The negative electrode material contains, as an essential component, a negative active material (lead), which exhibits a capacity by an oxidation reaction, and can contain additives such as a carbonaceous material, barium sulfate, and an organic expander. The negative active material in a charged state is spongy lead, but a non-chemically converted negative electrode plate is usually produced using lead powder.

As the carbonaceous material contained in the negative electrode material, carbon black, graphite, hard carbon, soft carbon, and the like can be used. Examples of the carbon black include acetylene black, Ketjen black, furnace black, and lamp black. The graphite may only be a carbon material including a graphite type crystal structure and may be either artificial graphite or natural graphite.

The content of the carbonaceous material in the negative electrode material is, for example, preferably 0.05% by mass or more, and more preferably 0.2% by mass or more. On the other hand, the content is preferably 4.0% by mass or less, more preferably 3% by mass or less, and still more preferably 2% by mass or less. Any combination of these lower and upper limits is possible.

The content of barium sulfate in the negative electrode material is, for example, preferably 0.5% by mass or more, more preferably 1% by mass or more, and still more preferably 1.3% by mass or more. On the other hand, the content is preferably 3.0% by mass or less, more preferably 2.5% by mass or less, and still more preferably 2% by mass or less. Any combination of these lower and upper limits is possible.

The organic expander is an organic polymer containing a sulfur element and generally contains one or more, preferably a plurality of, aromatic rings in the molecule and the sulfur element as a sulfur-containing group. Among the sulfur-containing groups, a sulfonic acid group or a sulfonyl group, which is a stable form, is preferred. The sulfonic acid group may be present in an acid form, or in a salt form such as Na salt.

In a preferred embodiment, for example, a first organic expander having a sulfur element content of 1000 µmol/g or less and further 900 µmol/g or less and a second organic expander having a sulfur element content of 4000 µmol/g or more and further 5000 µmol/g or more are used in combination. The use of such two kinds of organic expanders is advantageous for formation of a negative electrode material satisfying the conditions A and B, although the conditions are not sufficient. By providing a large difference in the sulfur element content, a large difference is also likely to occur in the effect of each organic expander on the pore structure. Therefore, it is considered that a plurality of peaks appear in the log differential pore volume distribution of the negative electrode material after the light-load life test, thus facilitating clear separation of the plurality of peaks.

Here, that the content of the sulfur element in the organic expander is X µmol/g means that the content of the sulfur element contained in 1 g of the organic expander is X µmol.

As the first organic expander, for example, at least one selected from the group consisting of lignin, lignin sulfonic acid, and lignin sulfonic acid salt. (hereinafter collectively referred to as lignin-based expander) is used. The content of the sulfur element in the lignin-based expander is usually 250 to 650 µmol/g.

As the second organic expander, for example, a condensate of a compound having a sulfur-containing group and an aromatic ring with an aldehyde compound can be used. As the compound having an aromatic ring, at least one selected from the group consisting of a phenolic compound (including a bisphenol compound), a biphenyl compound, and a naphthalene compound can be used. Among those, a compound having two or more aromatic rings is preferred.

There is a limit to increase the content of the sulfur element in the organic expander. Hence the content of the sulfur element in the second organic expander is preferably 10000 µmol/g or less, and more preferably 9000 µmol/g or less.

The phenol compound, the biphenyl compound, and the naphthalene compound having two or more aromatic rings are general names of compounds having a bisphenol skeleton, a biphenyl skeleton, and a naphthalene skeleton, respectively, and each may have a substituent. These may be contained in the second organic expander alone or in combination. As the bisphenol, bisphenol A, bisphenol S, bisphenol F, and the like are preferred. Among those, bisphenol S has a sulfonyl group (—$SO_2$—) in the bisphenol skeleton, and it is thus easy to increase the content of the sulfur element.

The sulfur-containing group may be directly bonded to the aromatic ring of the bisphenol compound, the biphenyl compound, the naphthalene compound, or the like, and may be bonded to the aromatic ring as an alkyl chain having a sulfur-containing group, for example. Alternatively, a monocyclic aromatic compound such as aminobenzenesulfonic acid or alkylaminobenzenesulfonic acid may be condensed with formaldehyde together with a compound having two or more aromatic rings.

A condensate of the bisphenol compound, a condensate of a naphthalene sulfonic acid, and a compound having a relatively high sulfur content among lignin sulfonic acids are suitable for forming a pore structure advantageous for a lead-acid battery to maintain low-temperature HR discharge characteristics after experiencing an environment at a temperature higher than normal temperature. On the other hand, a compound having a relatively low sulfur content is suitable for forming a pore structure having excellent liquid reduction resistance.

The content of the organic expander contained in the negative electrode material does not greatly affect the action of the organic expander within a general range. The content of the organic expander contained in the negative electrode material is, for example, preferably 0.01% by mass or more, more preferably 0.02% by mass or more, and still more preferably 0.05% by mass or more. On the other hand, the content is preferably 1.0% by mass or less, more preferably 0.8% by mass or less, and still more preferably 0.3% by mass or less. Here, the content of the organic expander contained in the negative electrode material is a content in the negative electrode material collected from a chemically converted lead-acid battery in the fully charged state by a method to be described later. Any combination of these lower and upper limits is possible.

The negative electrode plate is obtained by filling a negative current collector with a negative electrode paste, curing and drying the negative electrode paste to produce a non-chemically converted negative electrode plate, and then chemically converting the negative electrode plate. The negative electrode paste is produced by adding water and sulfuric acid to lead powder and various additives, and the mixture is kneaded. In the curing step, it is preferable to cure the non-chemically converted negative electrode plate at room temperature or a higher temperature and higher humidity.

The chemical conversion can be performed by charging the element in a state where the element including the non-chemically converted negative electrode plate is immersed in the electrolyte solution containing sulfuric acid in the container of the lead-acid battery. However, the chemical conversion may be performed before the lead-acid battery or the element is assembled. The chemical conversion produces spongy lead.

The density of the negative electrode material may only be, for example, 2.5 to 4.0 g/cm$^3$, and may be 2.5 to 3.8 g/cm$^3$ or 2.5 to 3.5 g/cm$^3$.

Next, a method of analyzing the physical properties of the negative electrode plate will be described.

[Initial Sample]

The negative electrode plate to be analyzed is obtained by fully charging the chemically converted lead-acid battery and then disassembling the battery. Except for a case where the log differential pore volume distribution of the negative electrode material after 1220 cycles of the 75° C. 1'-10' light-load life test is measured, the lead-acid battery may be in the fully charged state immediately after the chemical conversion or in the fully charged state after a lapse of time from the chemical conversion. For example, a lead-acid battery in use (preferably in the initial stage of use) may be fully charged after chemical conversion. The battery in the initial stage of use refers to a battery that has not been used for a long time and has hardly been degraded. The obtained negative electrode plate is washed with water and dried to remove the electrolyte solution in the negative electrode plate. Next, the negative electrode material is separated from the negative electrode plate to obtain an uncrushed initial sample.

[Log Differential Pore Volume Distribution]

After an uncrushed measurement sample is put into a measurement case and evacuated, a log differential pore volume distribution is measured in a region of pore size of 5.5 nm or more and 333 μm or less by a mercury intrusion method at a pressure of 0.05 psia or more and 30000 psia or less (≈0.345 kPa or more and 20700 kPa or less).

[Measurement of Bulk Density]

The density of the electrode material means a value of the bulk density of a chemically converted electrode material in the fully charged state and is measured as follows. An uncrushed measurement sample is charged into a measurement case, evacuated, filled with mercury at a pressure of 0.5 psia to 0.55 psia (≈3.45 kPa or more and 3.79 kPa or less), the bulk volume of the electrode material is measured, and the mass of the measurement sample is divided by the bulk volume to determine the bulk density of the electrode material. A volume obtained by subtracting the injection volume of mercury from the volume of the measurement case is defined as the bulk volume.

Hereinafter, a method of quantifying the amounts of the organic expander, the carbonaceous material, and the barium sulfate contained in the negative electrode material will be described. Prior to quantitative analysis, a chemically converted lead-acid battery is fully charged and disassembled to obtain a negative electrode plate to be analyzed. The obtained negative electrode plate is washed with water and dried to remove the electrolyte solution in the negative electrode plate. Next, the negative electrode material is separated from the negative electrode plate to obtain an uncrushed initial sample.

[Analysis of Organic Expander]

The uncrushed initial sample is crushed, and the crushed initial sample is immersed in a 1 mol/L NaOH aqueous solution to extract the organic expander. An insoluble component is removed from a NaOH aqueous solution containing the extracted organic expander by filtration. The obtained filtrate (hereinafter also referred to as a filtrate to be analyzed) is desalted, concentrated, and dried to obtain a powder of the organic expander (hereinafter also referred to as a powder to be analyzed). Desalting may be performed by immersing the filtrate in distilled water in a dialysis tube.

The organic expander is specified by obtaining information from an infrared spectral spectrum of the powder to be analyzed, an ultraviolet-visible absorption spectrum of a solution obtained by dissolving the powder to be analyzed in distilled water or the like, a nuclear magnetic resonance (NMR) spectrum of a solution obtained by dissolving the powder to be analyzed in a solvent such as heavy water, or the like.

[Content of Organic Expander]

The ultraviolet-visible absorption spectrum of the filtrate to be analyzed is measured. The content of the organic expander in the negative electrode material is quantified using a spectral intensity and a calibration curve prepared in advance. When the structural formula of the organic expander to be analyzed cannot be exactly specified and the calibration curve of the same organic expander cannot be used, the calibration curve is prepared using an available organic polymer exhibiting an ultraviolet-visible absorption spectrum, an infrared spectral spectrum, an NMR spectrum, and the like similar to the organic expander to be analyzed.

[Content of Sulfur Element]

The sulfur element in the organic expander is converted into sulfuric acid by an oxygen combustion flask method, and the content of the sulfur element in the organic expander is quantified. 0.1 g of the powder to be analyzed is burned in a flask containing an adsorbent to prepare an eluate in which sulfate ions are dissolved in the adsorbent. The eluate is titrated with barium perchlorate by using thorin as an indicator, and the content of a sulfur element (C1) in 0.1 g of the organic expander is determined. The content of sulfur element (μmol/g) in 1 g of the organic expander is calculated by multiplying C1 by 10.

[Carbonaceous Material and Barium Sulfate]

The uncrushed initial sample is crushed, 50 ml of (1+2) nitric acid is added to 10 g of the pulverized initial sample, and the mixture is heated for about 20 minutes to dissolve a lead component as lead nitrate. Next, a solution containing lead nitrate is filtered, and solids such as carbonaceous materials and barium sulfate are filtered off.

The obtained solid is dispersed in water to form a dispersion, and then components except for the carbonaceous material and barium sulfate (e.g., reinforcing material) are removed from the dispersion by using a sieve. Next, the dispersion is subjected to suction filtration using a membrane filter with its mass measured in advance, and the membrane filter is dried with the filtered sample in a dryer at 110° C. The filtered sample is a mixed sample of a carbonaceous material and barium sulfate. A mass (A) of the mixed sample is measured by subtracting the mass of the membrane filter from the total mass of the dried mixed sample and the membrane filter. Thereafter, the dried mixed sample is placed in a crucible together with the membrane filter, and the crucible is heated to a temperature of 700° C. or higher. The remaining residue is barium oxide. A mass (B) of barium sulfate is determined by converting the mass of barium oxide to the mass of barium sulfate. The mass of the carbonaceous material is calculated by subtracting the mass B from the mass A.

In the case of a flooded-type battery, the fully charged state of the lead-acid battery is a state where, in a water bath at 25° C., constant current charge is performed at a current 0.2 times the value stated in the rated capacity until the battery reaches 2.5 V/cell, and then constant current charge is performed at a current 0.2 times the value stated in the rated capacity for two hours.

In the case of a valve regulated battery, the fully charged state of the lead-acid battery is a state where a constant current constant voltage charge of 2.23 V/cell is performed in an air bath at 25° C. with a current 0.2 times the value indicated in the rated capacity, and charge is completed when the charge current at the constant voltage charge becomes 0.005 times the value indicated in the rated capacity.

(Positive Electrode Plate)

The positive electrode plate of a lead-acid battery can be classified into a paste type, a clad type, and the like. The paste-type positive electrode plate includes a positive current collector and a positive electrode material and may include a sticking member when necessary. The positive electrode material is held on the positive current collector. The positive electrode material is obtained by removing the positive current collector and the sticking member from the positive electrode plate. The sticking member is a member, such as a mat or a pasting paper, arbitrarily stuck to the positive electrode plate. The positive electrode plate includes a sticking member that is stuck to the positive electrode plate and used as an integral part of the positive electrode plate. On the other hand, when the sticking member is attached to the separator, the sticking member is included in the separator.

As the lead or lead alloy used for the positive current collector, a Pb—Ca based alloy, a Pb—Ca—Sn based alloy, lead having a purity of three nines or higher, and the like are used preferably. The positive current collector may have lead alloy layers having different compositions, and a plurality of alloy layers may be used. The clad-type positive electrode includes a plurality of porous tubes, a spine inserted into each tube, a positive electrode material with which a spine inserted tube is filled, and a joint that joins the plurality of tubes. It is preferable to use a Pb-Sb-based alloy for the spine.

The positive electrode material contains a positive active material (lead dioxide) that develops a capacity through a reductive reaction. The positive electrode material may contain additives such as tin sulfate and red lead when necessary, in addition to the positive active material.

The paste-type positive electrode plate is obtained by filling a positive current collector with a positive electrode paste, curing and drying the positive electrode paste to produce a non-chemically converted positive electrode plate, and then chemically converting the positive electrode plate. The positive electrode paste is produced by adding water and sulfuric acid to lead powder and various additives, and the mixture is kneaded. In the curing step, it is preferable to cure the non-chemically converted positive electrode plate at room temperature or a higher temperature and higher humidity. A clad-type positive electrode plate is formed by filling a spine inserted porous glass tube with lead powder or slurry-like lead powder and joining a plurality of tubes with a joint.

(Electrolyte Solution)

The electrolyte solution is an aqueous solution containing sulfuric acid and may be gelled as necessary. The specific gravity of the electrolyte solution in the chemically converted lead-acid battery in the fully charged state is, for example, 1.20 to 1.35 at 20° C. and preferably 1.25 to 1.32.

(Separator)

A separator is usually disposed between the negative electrode plate and the positive electrode plate. A nonwoven fabric, a microporous film, or the like is used as the separator. The nonwoven fabric is a mat in which fibers are intertwined without being woven and is mainly made of fibers. For example, 60% by mass or more of the nonwoven fabric is formed of fibers. As the fiber, glass fiber, polymer fiber, pulp fiber, or the like can be used. The nonwoven fabric may contain components in addition to the fibers, such as an acid-resistant inorganic powder and a polymer as a binder. The microporous film is a porous sheet mainly made of components except for fiber components and is obtained by, for example, extrusion molding a composition containing, for example, a pore-forming additive (polymer powder, oil, etc.) into a sheet shape and then removing the pore-forming additive to form pores. The microporous film is preferably made mainly of a polymer component. As such a polymer material, a polyolefin such as polyethylene or polypropylene is preferred.

Figure 9:
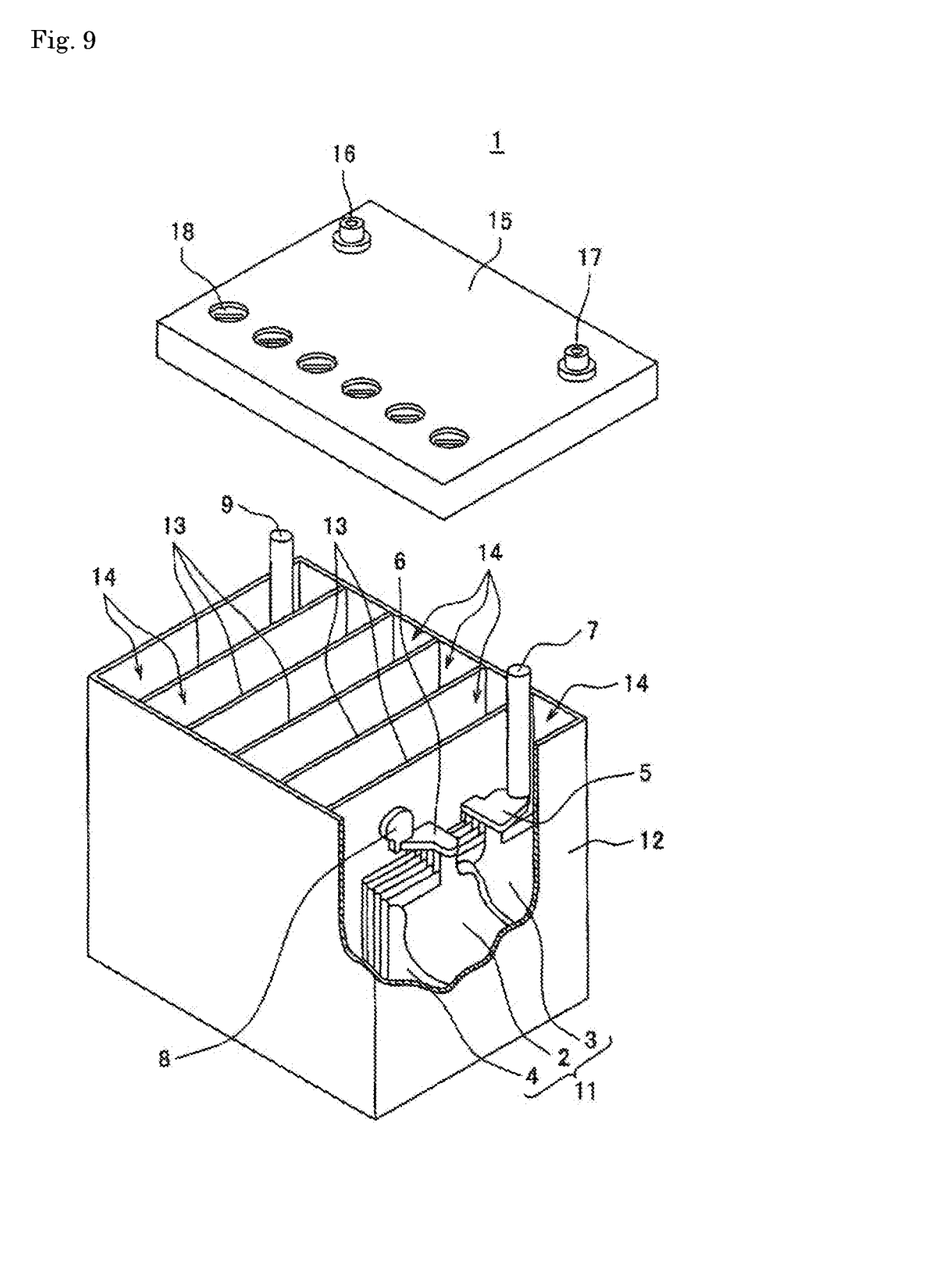
FIG. 9 is a perspective view showing an external appearance and a partially cut-off internal structure of a lead-acid battery according to an embodiment of the present invention.

FIG. 9 shows an external appearance of an example of the lead-acid battery according to the embodiment of the present invention. A lead-acid battery 1 includes a container 12 storing an element 11 and an electrolyte solution (not shown). The inside of the container 12 is partitioned into a plurality of cell chambers 14 by partitions 13. In each cell chamber 14, one element 11 is stored. The opening of the container 12 is closed with a lid 15 having a negative electrode terminal 16 and a positive electrode terminal 17. The lid 15 is provided with a vent plug 18 for each cell chamber. At the time of water addition, the vent plug 18 is removed to supply a water addition liquid. The vent plug 18 may have a function of discharging gas generated in the cell chamber 14 to the outside of the battery.

The element 11 is configured by laminating a plurality of negative electrode plates 2 and positive electrode plates 3 with a separator 4 interposed therebetween. Here, the bag-shaped separator 4 storing the negative electrode plate 2 is shown, but the form of the separator is not particularly limited. In the cell chamber 14 located at one end of the container 12, a negative electrode shelf 6 for connecting lugs of the plurality of negative electrode plates 2 in parallel is connected to a through-connector 8, and a positive electrode shelf 5 for connecting lugs of the plurality of positive electrode plates 3 in parallel is connected to a positive electrode pole 7. The positive electrode pole 7 is connected to the positive electrode terminal 17 outside the lid 15. In the cell chamber 14 located at the other end of the container 12, a negative electrode pole 9 is connected to the negative electrode shelf 6, and the through-connector 8 is connected to the positive electrode shelf 5. The negative electrode pole 9 is connected to the negative electrode terminal 16 outside the lid 15. Each through-connector 8 passes through a through-hole provided in the partition 13 and connects the elements 11 of the adjacent cell chambers 14 in series.

Although FIG. 9 shows an example of a flooded-type battery (vented battery), the lead-acid battery may be a valve regulated battery (VRLA type).

Hereinafter, the present invention will be further specifically described based on examples and comparative examples, but the present invention is not limited to the following examples.

<<Experiment 1>>

(1) Production of Negative Electrode Plate

A negative electrode material satisfying the conditions A and B is prepared using a plurality of organic expanders in combination.

Lead powder as a raw material, barium sulfate, carbon black, and a predetermined organic expander are mixed with an appropriate amount of a sulfuric acid aqueous solution to obtain a negative electrode paste. A mesh portion of an expanded grid made of a Pb—Ca—Sn alloy is filled with the negative electrode paste, which is then cured and dried to obtain a non-chemically converted negative electrode plate.

The organic expander is blended to a negative electrode paste such that the content of the organic expander in the negative electrode material in the lead-acid battery, fully charged after chemical conversion, is 0.2% by mass. The blending of the negative electrode paste is controlled such that the density of the negative electrode material of the lead-acid battery, fully charged after chemical conversion, is 3.3 g/cm$^3$ and the log differential pore volume distribution of the negative electrode material is the P, Q and R (R0) values in Tables 1A, 2A and 3A.

After charge and discharge are repeated over 1220 cycles in the 75° C. 1'-10' light-load life test, various organic expanders are used and various conditions are adjusted such that the log differential pore volume distribution of the negative electrode material becomes P, Q, and R (R1220) values of Tables 1B, 2B, and 3B.

Table 4 shows the specifications of the organic expander. Among the organic expander, $LIG_{600}$ and $LIG_{300}$ are lignin-based expanders. Each of $BIS_{5000}$ and $BIS_{6000}$ is a condensate of a bisphenol compound having a sulfonic acid group introduced therein with formaldehyde.

TABLE 1A $LIG_{600}$ and $BIS_{6000}$/immediately after chemical conversion

| Item | Battery | | | | |
|------|------|------|------|------|------|
|      | A1   | A2   | A3   | A4   | A5   |
| P    | 0.33 | 0.32 | 0.24 | 0.26 | 0.23 |
| Q    | 0.015 | 0.014 | 0.0092 | 0.010 | 0.012 |
| R0   | 0.96 | 0.96 | 0.96 | 0.96 | 0.95 |

TABLE 1B $LIG_{600}$ and $BIS_{6000}$/after 1220 cycle

| Item | Battery | | | | |
|------|------|------|------|------|------|
|      | A1   | A2   | A3   | A4   | A5   |
| P    | 0.032 | 0.046 | 0.081 | 0.12 | 0.17 |
| Q    | 0.14 | 0.10 | 0.099 | 0.085 | 0.071 |
| R1220 | 0.19 | 0.31 | 0.45 | 0.59 | 0.70 |

TABLE 2A $LIG_{600}$ and $BIS_{5000}$/immediately after chemical conversion

| Item | Battery | | | | |
|------|------|------|------|------|------|
|      | B1   | B2   | B3   | B4   | B5   |
| P    | 0.29 | 0.31 | 0.27 | 0.22 | 0.20 |
| Q    | 0.014 | 0.014 | 0.010 | 0.0092 | 0.012 |
| R0   | 0.96 | 0.96 | 0.95 | 0.95 | 0.94 |

TABLE 2B $LIG_{600}$ and $BIS_{5000}$/after 1220 cycles

| Item | Battery | | | | |
|------|------|------|------|------|------|
|      | B1   | B2   | B3   | B4   | B5   |
| P    | 0.026 | 0.041 | 0.065 | 0.10 | 0.14 |
| Q    | 0.14 | 0.11 | 0.096 | 0.083 | 0.073 |
| R1220 | 0.16 | 0.27 | 0.40 | 0.55 | 0.66 |

TABLE 3A $LIG_{300}$ and $BIS_{6000}$/immediately after chemical conversion

| Item | Battery | | | | |
|------|------|------|------|------|------|
|      | C1   | C2   | C3   | C4   | C5   |
| P    | 0.34 | 0.31 | 0.23 | 0.24 | 0.22 |
| Q    | 0.015 | 0.014 | 0.010 | 0.0092 | 0.012 |
| R0   | 0.96 | 0.94 | 0.95 | 0.95 | 0.96 |

TABLE 3B $LIG_{300}$ and $BIS_{6000}$/after 1220 cycles

| Item | Battery | | | | |
|------|------|------|------|------|------|
|      | C1   | C2   | C3   | C4   | C5   |
| P    | 0.033 | 0.044 | 0.087 | 0.11 | 0.15 |
| Q    | 0.11 | 0.080 | 0.076 | 0.073 | 0.059 |
| R1220 | 0.23 | 0.36 | 0.53 | 0.60 | 0.72 |

TABLE 4

| Name of organic expander | Detail |
|---|---|
| $LIG_{600}$ | Lignin sulfonic acid with amount of S of 600 $\mu mol \cdot g^{-1}$ |
| $LIG_{300}$ | Lignin sulfonic acid with amount of S of 300 $\mu mol \cdot g^{-1}$ |
| $BIS_{5000}$ | Bisphenol sulfonic acid with amount of S of 5000 $\mu mol \cdot g^{-1}$ |
| $BIS_{60000}$ | Bisphenol sulfonic acid with amount of S of 6000 $\mu mol \cdot g^{-1}$ |

(2) Production of Positive Electrode Plate

Lead oxide powder as a raw material is mixed with a sulfuric acid aqueous solution to obtain a positive electrode paste. A mesh portion of an expanded grid made of a Pb—Ca—Sn alloy is filled with the positive electrode paste, which is then cured and dried to obtain a non-chemically converted positive electrode plate.

(3) Batteries A1 to A5, B1 to B5, and C1 to C5

[Evaluation 1]

(i) Production of Sample Cells X for Batteries A1 to A5, B1 to B5, and C1 to C5

A 2 V cell conforming to an "M-42" type lead-acid battery is produced. Here, an electrode group is formed using seven non-chemically converted negative electrode plates and seven non-chemically converted positive electrode plates stored in the bag-shaped separator. The electrode group is stored into a polypropylene container together with an electrolyte solution (sulfuric acid aqueous solution having a specific gravity of 1.210) and subjected to chemical conversion in the container to produce a sample cell X (2 V, five-hour rate rated capacity of 30 Ah). The cell configuration, such as the number of positive and negative electrode plates, is not limited to the above, and a 2 V cell of any configuration may be cut out from a completed lead-acid battery having a plurality of cell chambers.

(ii) Measurement of Initial Log Differential Pore Volume Distribution

The sample cell X immediately after full charge after chemical conversion is disassembled, and the obtained negative electrode plate is washed with water and dried to remove the electrolyte solution in the negative electrode plate. Next, the negative electrode material is separated from the negative electrode plate to obtain an uncrushed measurement sample, and the log differential pore volume distribution in a region of the measurement sample having a pore size of 5.5 nm or more and 333 μm or less is measured by a mercury intrusion method. As a measuring device, an automatic porosimeter (Autopore IV9505) manufactured by Shimadzu Corporation is used. FIGS. 1A, 2A, 3A, and 4A show the log differential pore volume distributions of the negative electrode materials in the batteries A1, A2, A4, A5 immediately after the chemical conversion.

(iii) 75° C. 1'-10' Light-Load Life Test

Charge and discharge in which the sample cell X fully charged after chemical conversion is subjected to constant current discharge at 25 A for one minute and constant voltage charge at 2.47 V and an upper limit current of 25 A for ten minutes are repeated at a test temperature of 75° C. over 1220 cycles.

(iv) Measurement of Log Differential Pore Volume Distribution After 1220 Cycles

The sample cell X in the fully charged state after 1220 cycles is disassembled, and the obtained negative electrode plate is washed with water and dried to remove the electrolyte solution in the negative electrode plate. Next, the negative electrode material is separated from the negative electrode plate to obtain an uncrushed measurement sample, and similarly to (2) above, the log differential pore volume distribution in a region of the measurement sample having a pore size of 5.5 nm or more and 333 μm or less is measured by a mercury intrusion method. FIGS. 1B, 2B, 3B, and 4B show the log differential pore volume distributions of the negative electrode materials in the batteries A1, A2, A4, A5 after 1220 cycles.

[Evaluation 2]

In the 75° C. 1'-10' light-load life test, charge and discharge of the sample cell X is repeated over 1220 cycles, and then the low-temperature HR discharge duration time is measured. Specifically, the sample cell X in the fully charged state is subjected to a constant current discharge at a test temperature of −15° C. with a current (150 A) five times the value indicated in the five-hour rate rated capacity to a termination voltage of 1.0 V, and the discharge duration time is measured. The results are shown in Tables 5 to 7 and FIG. 5.

[Evaluation 3]

An approximate straight line indicating the relationship between the number of charge-discharge cycles of the sample cell X and the amount of liquid reduction in the 75° C. 1'-10' light-load life test is determined. The amount of liquid reduction per cycle is determined from a slope of an approximate straight line. The results are shown in Tables 5 to 7 and FIG. 6.

[Evaluation 4]

(i) Production of Sample Cells Y for Batteries A1 to A5, B1 to B5, and C1 to C5

A single plate cell (sample cell Y) is produced using a negative electrode plate constituting an "M-42" type lead-acid battery. Specifically, a single plate cell is formed of one non-chemically converted negative electrode plate stored in a bag-shaped separator and two chemically converted positive electrode plates having a sufficiently large capacity with respect to the negative electrode plates, and the single plate cell is subjected to chemical conversion in an electrolyte solution (sulfuric acid aqueous solution having a specific gravity of 1.260) to produce a sample cell Y.

(ii) Measurement of Amount of Electricity at Tenth Second 0.6 times the theoretical negative electrode capacity (10.3 Ah) of the sample cell Y is set as the rated capacity (6.18 Ah), and the sample cell Y is discharged for 30 minutes at a current (1.24 A) 0.2 times the rated capacity. Next, the sample cell Y after discharge is left for 12 hours. Thereafter, a potential of −0.3 V is applied to the negative electrode plate with respect to the reference electrode, and the amount of electricity is measured up to the tenth second. The results are shown in Tables 5 to 7 and FIG. 7.

TABLE 5

| | LIG$_{600}$ and BIS$_{6000}$ | | | | |
| --- | --- | --- | --- | --- | --- |
| | R1220 | | | | |
| Evaluation item | 0.186 | 0.310 | 0.450 | 0.586 | 0.703 |
| Initial low-temperature HR discharge duration time (s) | 293 | 288 | 291 | 292 | 290 |
| Low-temperature HR discharge duration time in 1220th cycle (s) | 193 | 204 | 212 | 221 | 223 |
| Amount of liquid reduction per cycle (g) | 0.0361 | 0.0355 | 0.0410 | 0.0500 | 0.0618 |
| Amount of electricity at 10th second (Ah) | 0.0329 | 0.0347 | 0.0370 | 0.0365 | 0.0340 |

TABLE 6

LIG$_{600}$ and BIS$_{5000}$

| | R1220 | | | | |
|---|---|---|---|---|---|
| Evaluation item | 0.157 | 0.272 | 0.404 | 0.546 | 0.657 |
| Initial low-temperature HR discharge duration time (s) | 297 | 294 | 288 | 292 | 291 |
| Low-temperature HR discharge duration time in 1220th cycle (s) | 190 | 199 | 208 | 217 | 221 |
| Amount of liquid reduction per cycle (g) | 0.0355 | 0.0356 | 0.0383 | 0.0459 | 0.0578 |
| Amount of electricity at 10th second (Ah) | 0.0322 | 0.0344 | 0.0364 | 0.0365 | 0.0347 |

TABLE 7

LIG$_{300}$ and BIS$_{6000}$

| | R1220 | | | | |
|---|---|---|---|---|---|
| Evaluation item | 0.231 | 0.355 | 0.534 | 0.601 | 0.718 |
| Initial low-temperature HR discharge duration time (s) | 290 | 290 | 286 | 287 | 294 |
| Low-temperature HR discharge duration time in 1220th cycle (s) | 197 | 206 | 215 | 223 | 225 |
| Amount of liquid reduction per cycle (g) | 0.0340 | 0.0351 | 0.0469 | 0.0519 | 0.0641 |
| Amount of electricity at 10th second (Ah) | 0.0336 | 0.0356 | 0.0380 | 0.0363 | 0.0334 |

(5) Consideration

Referring to Tables 1A, 2A, and 3A, R0 in the initial stage before the 75° C. 1'-10' light-load life test is close to 1 and exceeds 0.9 in every battery. On the other hand, referring to Tables 1B, 2B, and 3B, R1220 after 1220 cycles in the 75° C. 1'-10' light-load life test is a smaller value in every battery.

Figure 1A:
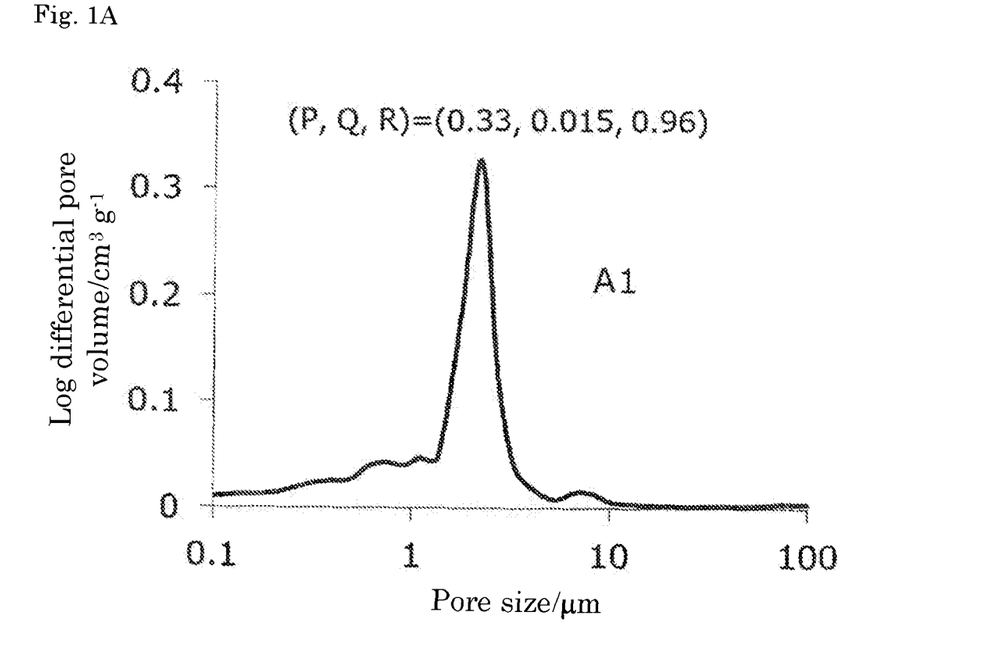
FIG. 1A is a graph showing a log differential pore volume distribution of a negative electrode material immediately after the chemical conversion of a battery A1.
Figure 1B:
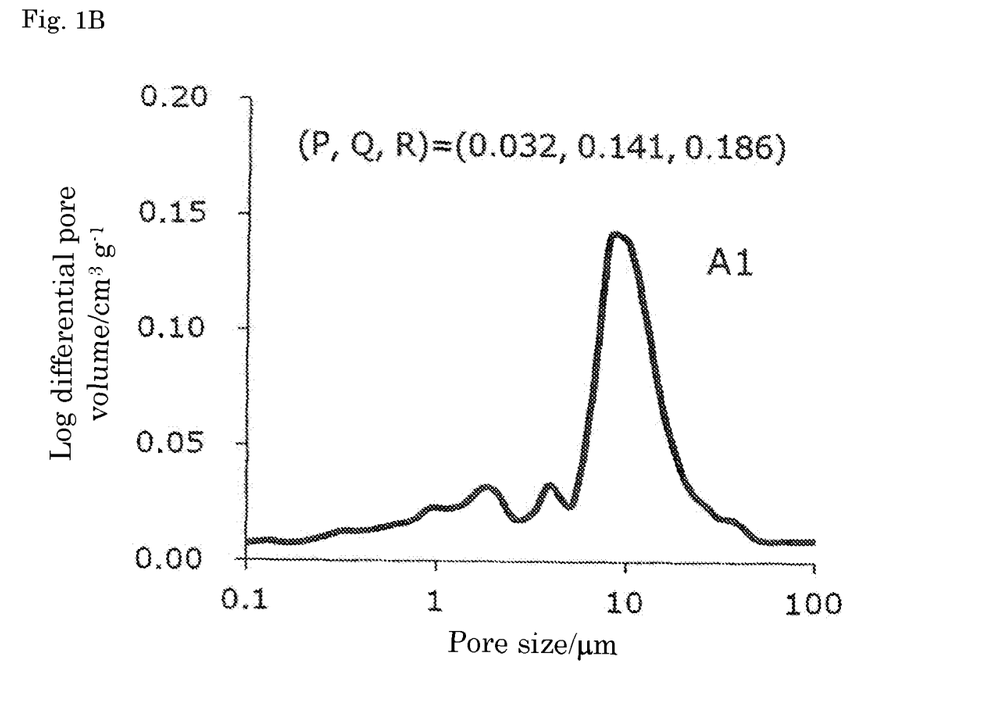
FIG. 1B is a graph showing the log differential pore volume distribution of the negative electrode material after 1220 cycles of the battery A1.

From Table 1B and FIG. 1B, it can be seen that when R1220 is less than 0.25, the peak p is very small, and the peak q is very large. On the other hand, referring to Table 1B and FIG. 4B, when R1220 exceeds 0.63, the peak p is very large, and the peak q is very small. That is, it can be seen that in the case of R1220<0.3 or 0.6<R1220, a distribution of the peak q alone or the peak p alone is obtained in practice.

Figure 2A:
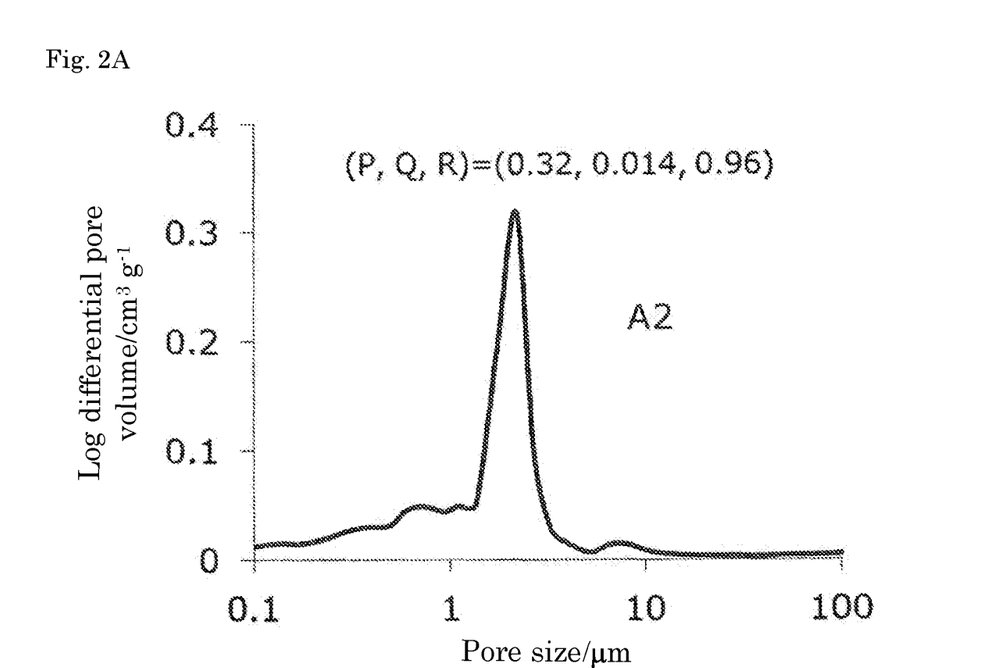
FIG. 2A is a graph showing a log differential pore volume distribution of a negative electrode material immediately after the chemical conversion of a battery A2.
Figure 2B:
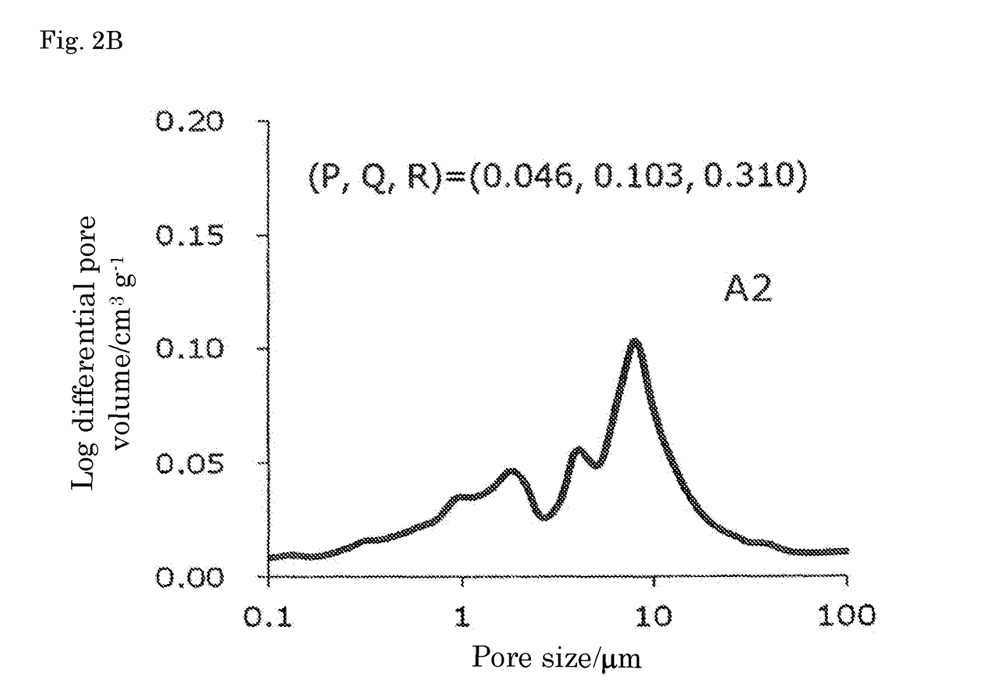
FIG. 2B shows the log differential pore volume distribution of the negative electrode material after 1220 cycles of the battery A2.
Figure 3A:
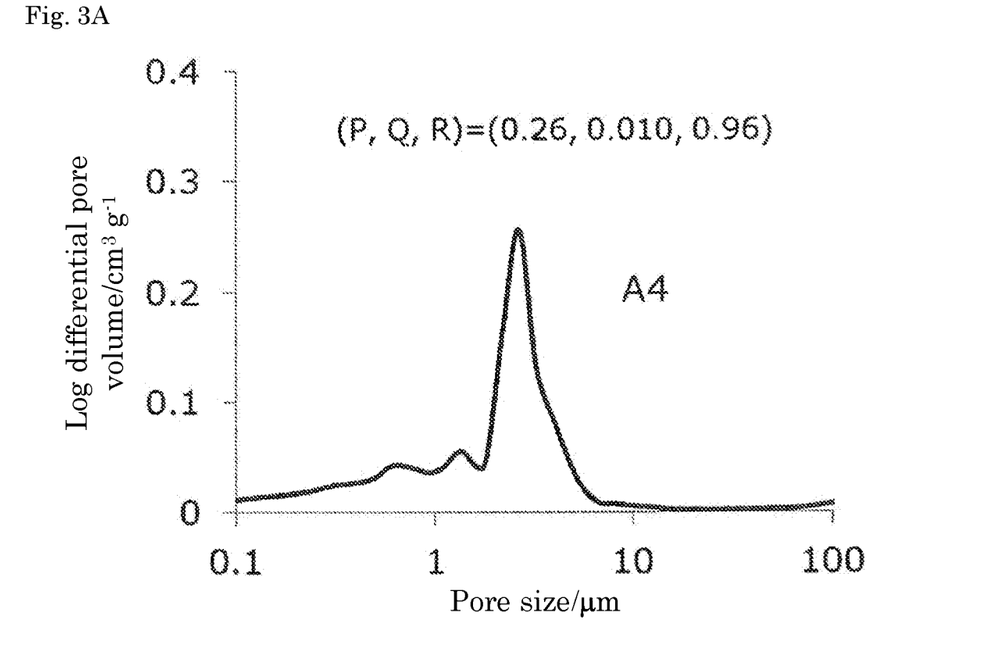
FIG. 3A is a graph showing a log differential pore volume distribution of a negative electrode material immediately after the chemical conversion of a battery A4.
Figure 3B:
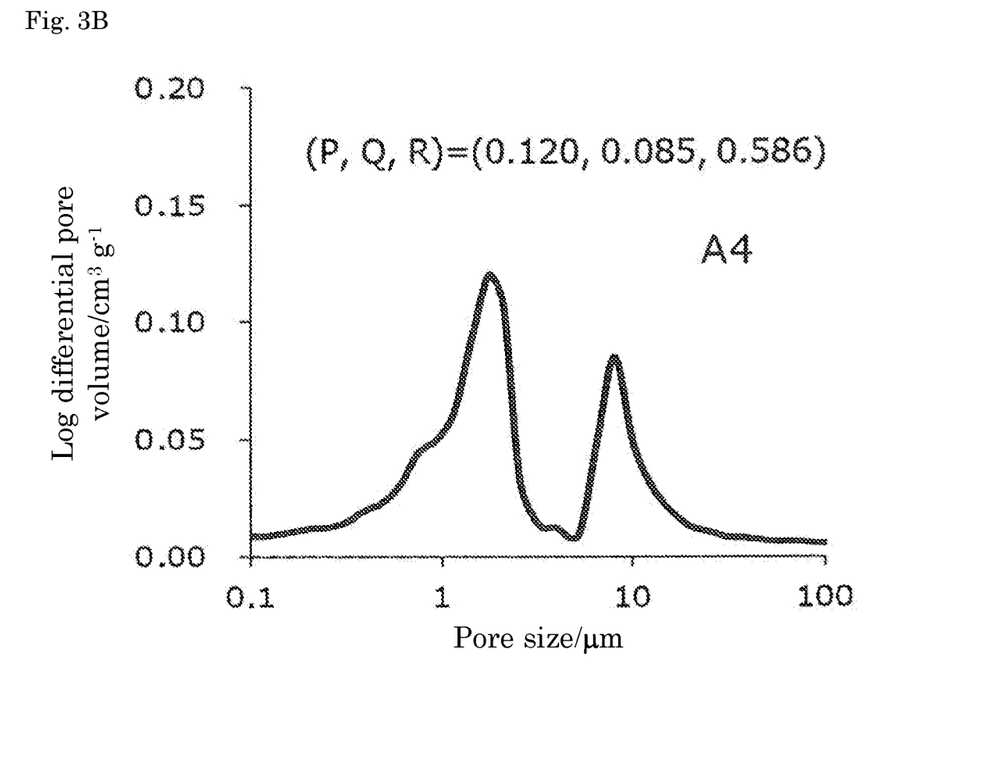
FIG. 3B shows the log differential pore volume distribution of the negative electrode material after 1220 cycles of the battery A4.
Figure 4A:
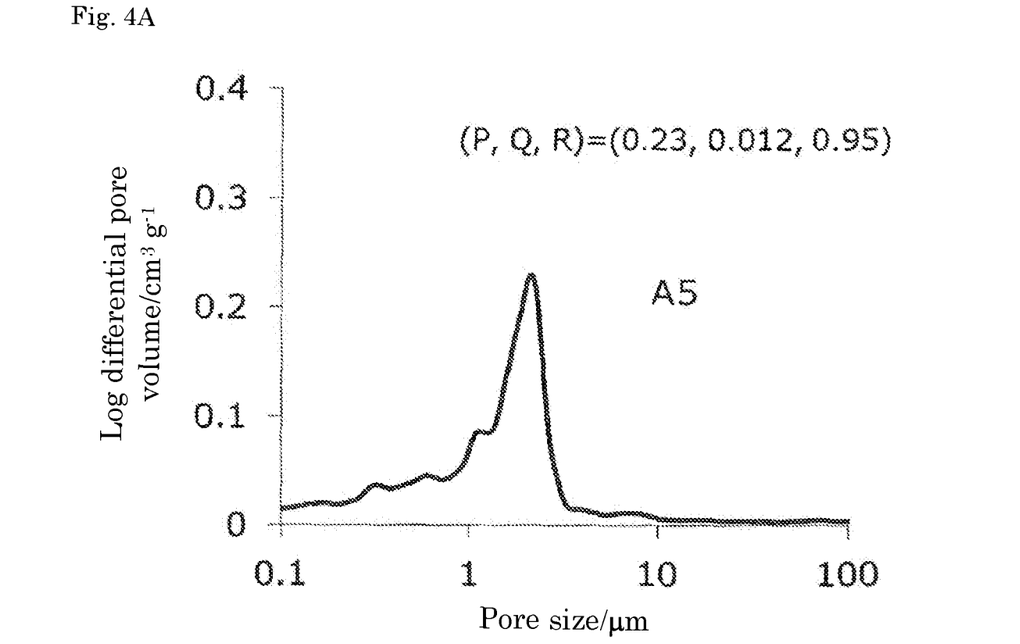
FIG. 4A is a graph showing a log differential pore volume distribution of a negative electrode material immediately after the chemical conversion of a battery A5.
Figure 4B:
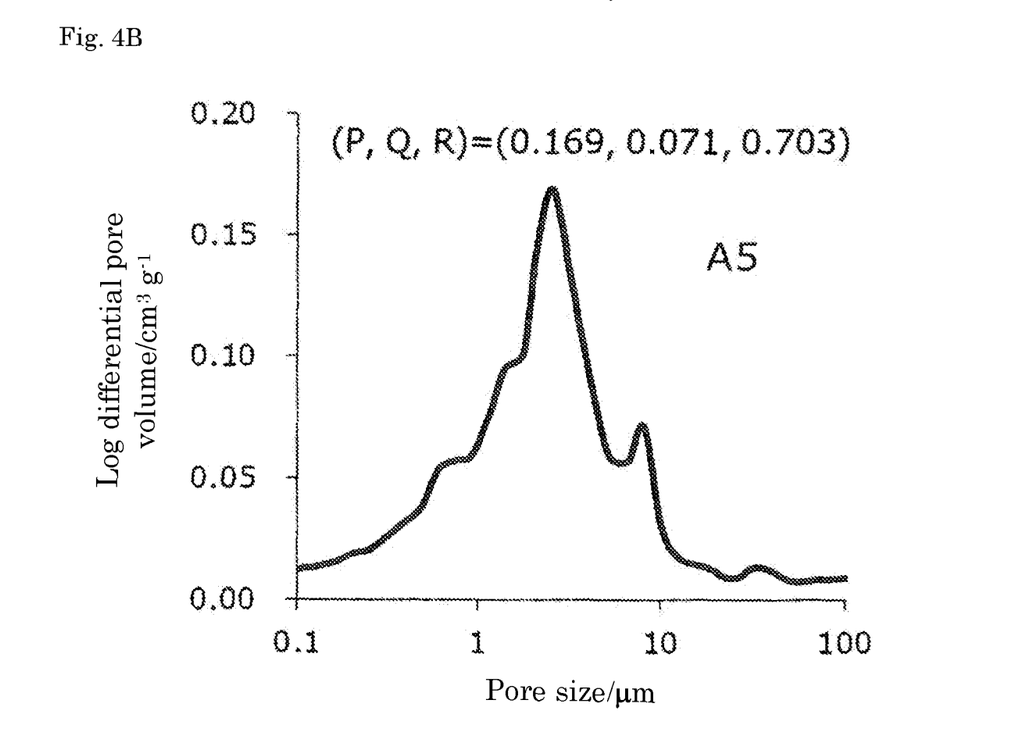
FIG. 4B shows the log differential pore volume distribution of the negative electrode material after 1220 cycles of the battery A5.

On the other hand, as shown in Table 1B and FIGS. 2B, 3B, and 4B, it can be seen that when 0.25≤R1120≤0.63 is satisfied, a distribution including two peaks of the peak p and the peak q is observed clearly.

Figure 5:
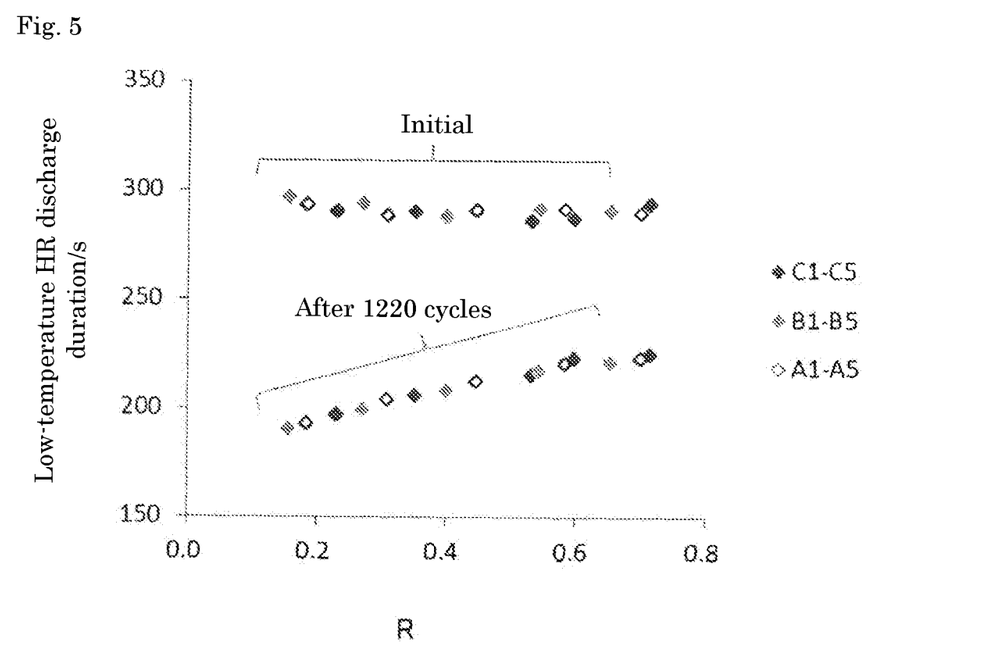
FIG. 5 is a graph showing the relationship between an R-value and low-temperature HR discharge characteristics.
Figure 6:
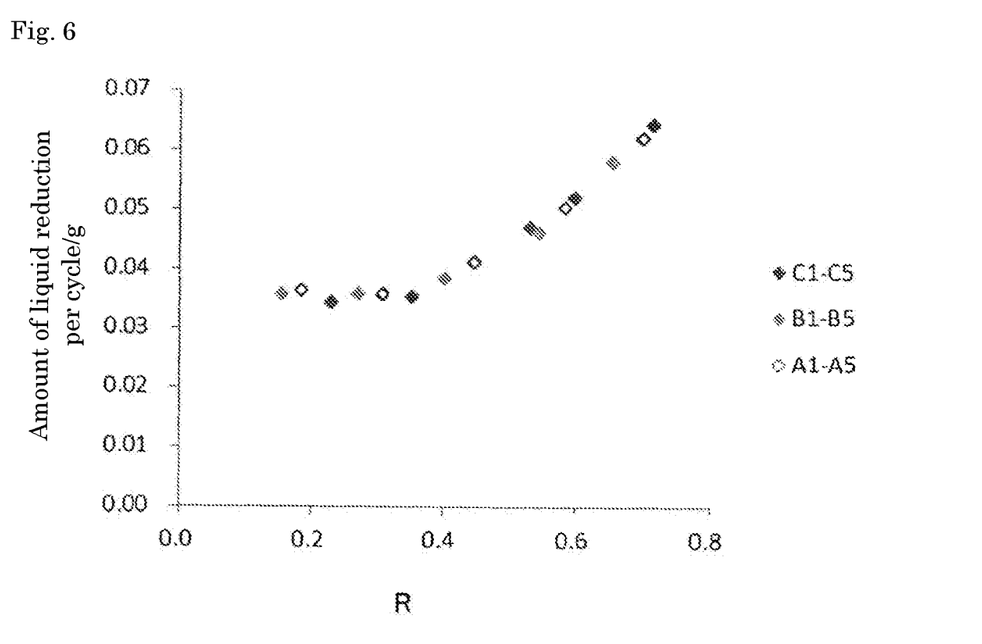
FIG. 6 is a graph showing the relationship between the R-value and the amount of liquid reduction per cycle.
Figure 7:
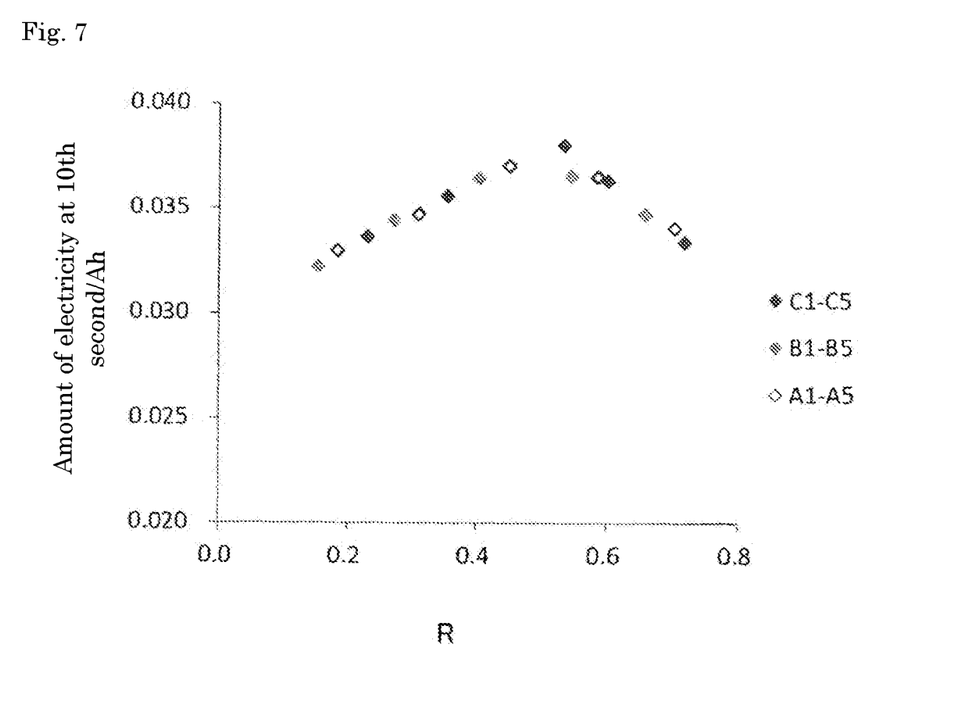
FIG. 7 is a graph showing the relationship between the R-value and the amount of electricity at a tenth second.

Next, from Tables 5 to 7 and FIGS. 5 to 7, the following can be understood. In FIG. 5, there is no clear correlation between the initial low-temperature HR discharge duration time and R1220. On the other hand, after 1220 cycles, there is a clear correlation between the low-temperature HR discharge duration time and R1220, and it can be seen that the larger R1220, the longer the low-temperature HR discharge duration time.

According to FIG. 6, in a region where R1220 is small, there is no difference in the amount of liquid reduction per cycle. However, when R1220 exceeds 0.63, the amount of liquid reduction per cycle starts to increase significantly. That is, there is seen a correlation that the amount of liquid reduction is large in a region where the low-temperature HR discharge duration time is long, and the low-temperature HR discharge duration time is short in a region where the amount of liquid reduction is small.

In view of the above tendency, it is important to satisfy 0.25≤R1220≤0.63 from the viewpoint of maintaining practical low-temperature HR discharge characteristics and reducing the liquid reduction.

Further, from FIG. 7, it can be seen that the amount of electricity at the tenth second reaches a peak at around R=0.5 and is particularly favorable in a range of 0.25≤R1220≤0.63. From the above, it can be seen that the pore structure satisfying 0.25≤R1220≤0.63 has an unexpected effect of maintaining favorable charge acceptance.

<<Experiment 2>>

<Comparative Batteries D1, D2>

Sample cells X, Y of comparative batteries D1, D2 are assembled similarly to the above except for the following point. Here, after charge and discharge are repeated 1220 times in the 75° C. 1'-10' light-load life test, various organic expanders are used and various conditions are adjusted such that the log differential pore volume distribution of the negative electrode material becomes P, Q, and R-values of Table 8. The low-temperature HR discharge duration time after 1220 cycles in the 75° C. 1'-10' light-load life test is measured to determine the amount of liquid reduction per cycle. The results are shown in Table 9.

The BIS$_{2000}$ of the organic expander is a condensate of a bisphenol compound having a sulfonic acid group introduced therein with formaldehyde and has a sulfur element content of 2000 μmol/g.

TABLE 8

| | Battery | |
|---|---|---|
| | D1 | D2 |
| | Organic expander | |
| Item | $BIS_{2000}/LIG_{600}$ | $BIS_{5000}/BIS_{6000}$ |
| P | 0.036 | 0.172 |
| Q | 0.131 | 0.065 |
| R1220 | 0.215 | 0.727 |

TABLE 9

| | Battery | |
|---|---|---|
| Evaluation item | D1 | D2 |
| Amount of liquid reduction per cycle (g) | 0.0330 | 0.0650 |
| Low-temperature HR discharge duration time in 1220th cycle (s) | 193 | 224 |

Each of the comparative batteries D1, D2 uses a plurality of different kinds of organic expanders but does not satisfy 0.25≤R1220≤0.63. Thus, in the battery D1, the low-temperature HR discharge duration time after 1220 cycles is short, and in the battery D2, the amount of liquid reduction per cycle is large. From this, it can be understood that in order to maintain the practical low-temperature HR discharge characteristics and reducing the liquid reduction, a necessary condition is to satisfy 0.25≤R1220≤0.63 rather than to use a plurality of kinds of organic expanders.

<<Experiment 3>>
<Comparative Battery E>

Sample cells X, Y of a comparative battery E are assembled similarly to the above except for the following point. Here, in the initial stage and after charge and discharge are repeated over 1220 cycles in the initial stage and the 75° C. 1'-10' light-load life test, various conditions are adjusted such that the log differential pore volume distribution of the negative electrode material becomes P, Q, and R-values of Table 10. Here, $LIG_{600}$ is used alone as the organic expander, and the blending of the negative electrode paste is controlled such that the density of the negative electrode material of the lead-acid battery fully charged after chemical conversion is 2.5 g/cm³.

The low-temperature HR discharge duration time of the comparative battery E is measured in the initial stage and after 1220 cycles in the 75° C. 1'-10' light-load life test. The results are shown in Table 11 and FIG. 8.

TABLE 10

| | Time | |
|---|---|---|
| Value | Initial | After 1220 cycles in light-load test |
| P | 0.0770 | 0.0320 |
| Q | 0.121 | 0.141 |
| R | 0.389 | 0.185 |

TABLE 11

| Result | $LIG_{600}$ alone, density of 2.5 cm⁻³ |
|---|---|
| Initial low-temperature HR discharge duration time (s) | 292 |

TABLE 11-continued

| Result | $LIG_{600}$ alone, density of 2.5 cm⁻³ |
|---|---|
| Low-temperature HR discharge duration time in 1220th cycle (s) | 182 |

Figure 8:
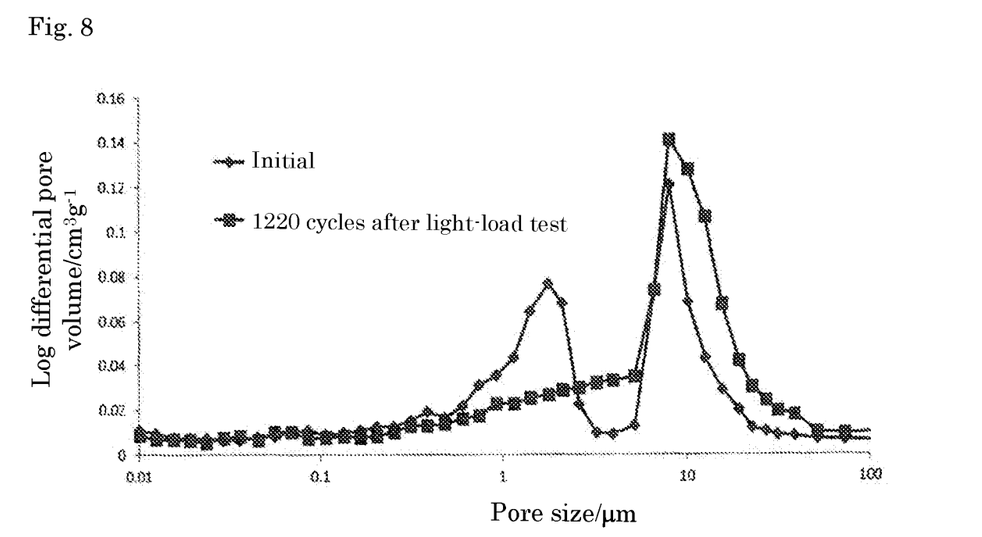
FIG. 8 is a graph showing a log differential pore volume distribution of a negative electrode material immediately after the chemical conversion of the battery E and after 1220 cycles.

Table 10 and FIG. 8 show a case where 0.25≤R0≤0.63 is satisfied in the initial stage, while 0.25≤R0≤0.63 is not satisfied after 1220 cycles in the 75° C. 1'-10' light-load life test. From Table 11, it can be understood that in such a case, the low-temperature HR discharge duration time after 1220 cycles is reduced significantly.

INDUSTRIAL APPLICABILITY

The lead-acid battery according to the present invention can be applied to both a flooded-type lead-acid battery and a valve regulated lead-acid battery and is suitably used as a power source for an automobile, a motorcycle, an electric vehicle (forklift, etc.), an industrial energy storage apparatus, or the like.

DESCRIPTION OF REFERENCE SIGNS

1: lead-acid battery
2: negative electrode plate
3: positive electrode plate
4: separator
5: positive electrode shelf
6: negative electrode shelf
7: positive electrode pole
8: through-connector
9: negative electrode pole
11: element
12: container
13: partition
14: cell chamber
15: lid
16: negative electrode terminal
17: positive electrode terminal
18: vent plug

The invention claimed is:
1. A lead-acid battery comprising:
a negative electrode plate;
a positive electrode plate; and
an electrolyte solution,
wherein
the negative electrode plate includes a negative current collector and a negative electrode material, and
when it is defined in a log differential pore volume distribution of the negative electrode material that
a) a region having a pore size of 1 to 3 μm is a P region,
b) a region having a pore size of 6 to 15 μm is a Q region,
c) a maximum value of the log differential pore volume in the P region is P, and
d) a maximum value of the log differential pore volume in the Q region is Q,
in a light-load life test in which charge and discharge of constant current discharge at 25 A for one minute and constant voltage charge at 2.47 V/cell and an upper limit current of 25 A for ten minutes are repeated at a test temperature of 75° C., the log differential pore volume distribution of the negative electrode material after 1220 cycles has a peak p corresponding to the maximum value P in the P region and a peak q corresponding to the maximum value Q in the Q region, and the maximum value P and the maximum value Q are configured to satisfy $0.25 \leq P/(P+Q) \leq 0.63$.

2. The lead-acid battery according to claim 1, wherein $0.7 \leq P/(P+Q)$ is satisfied before the light-load life test.

3. The lead-acid battery according to claim 1, wherein the negative electrode material includes a first organic expander and a second organic expander different from the first organic expander.

4. The lead-acid battery according to claim 3, wherein the first organic expander has a sulfur element content of 1000 μmol/g or less, and the second organic expander has a sulfur element content of 4000 μmol/g or more.

5. The lead-acid battery according to claim 4, wherein the first organic expander is at least one selected from the group consisting of lignin, lignin sulfonic acid, and lignin sulfonic acid salt.

6. The lead-acid battery according to claim 4, wherein
the second organic expander is a condensate of a compound having an aromatic ring with an aldehyde compound, and
the compound having the aromatic ring is at least one selected from the group consisting of a phenol compound, a biphenyl compound, and a naphthalene compound.

7. A lead-acid battery comprising:
a negative electrode plate;
a positive electrode plate; and
an electrolyte solution,
wherein
the negative electrode plate includes a negative current collector and a negative electrode material, and
when it is defined in a log differential pore volume distribution of the negative electrode material that
a) a region having a pore size of 1 to 3 μm is a P region,
b) a region having a pore size of 6 to 15 μm is a Q region,
c) a maximum value of the log differential pore volume in the P region is P, and
d) a maximum value of the log differential pore volume in the Q region is Q,
the log differential pore volume distribution of the negative electrode material during use has a peak p corresponding to the maximum value P in the P region and a peak q corresponding to the maximum value Q in the Q region, and the maximum value P and the maximum value Q satisfy $0.25 \leq P/(P+Q) \leq 0.63$.

8. A lead-acid battery comprising:
a negative electrode plate;
a positive electrode plate; and
an electrolyte solution,
wherein
the negative electrode plate includes a negative current collector and a negative electrode material, and
when it is defined in a log differential pore volume distribution of the negative electrode material that
a) a region having a pore size of 1 to 3 μm is a P region,
b) a region having a pore size of 6 to 15 μm is a Q region,
c) a maximum value of the log differential pore volume in the P region is P, and
d) a maximum value of the log differential pore volume in the Q region is Q,
the log differential pore volume distribution of the negative electrode material after initial degradation has a peak p corresponding to the maximum value P in the P region and a peak q corresponding to the maximum value Q in the Q region, and the maximum value P and the maximum value Q satisfy $0.25 \leq P/(P+Q) \leq 0.63$.

9. The lead-acid battery according to claim 1, wherein the maximum value P and the maximum value Q satisfy $0.30 \leq P/(P+Q) \leq 0.63$.

10. The lead-acid battery according to claim 1, wherein the maximum value P and the maximum value Q satisfy $0.25 \leq P/(P+Q) \leq 0.60$.

11. The lead-acid battery according to claim 1, wherein the maximum value P and the maximum value Q satisfy $0.40 \leq P/(P+Q) \leq 0.63$.

12. The lead-acid battery according to claim 1, wherein the maximum value P and the maximum value Q satisfy $0.40 \leq P/(P+Q) \leq 0.60$.

13. The lead-acid battery according to claim 1, wherein $0.9 \leq P/(P+Q)$ is satisfied before the light-load life test.

14. The lead-acid battery according to claim 8, wherein $0.7 \leq P/(P+Q)$ is satisfied before the initial degradation.

15. The lead-acid battery according to claim 8, wherein $0.9 \leq P/(P+Q)$ is satisfied before the initial degradation.

* * * * *